(12) United States Patent
Taylor

(10) Patent No.: US 12,269,622 B1
(45) Date of Patent: Apr. 8, 2025

(54) AMPHIBIOUS SMALL UNMANNED AERIAL AIRCRAFT SYSTEM (ASUMAAS)

(71) Applicant: Alan R. Taylor, Myakka City, FL (US)

(72) Inventor: Alan R. Taylor, Myakka City, FL (US)

(*) Notice: Subject to any disclaimer, the term of this patent is extended or adjusted under 35 U.S.C. 154(b) by 0 days.

(21) Appl. No.: 17/726,525

(22) Filed: Apr. 21, 2022

Related U.S. Application Data

(60) Provisional application No. 63/177,909, filed on Apr. 21, 2021.

(51) Int. Cl.
  *B64F 1/02* (2006.01)
  *B64C 29/00* (2006.01)
  *B64C 35/00* (2006.01)
  *B64C 39/12* (2006.01)
  *B64U 10/20* (2023.01)
  *B64U 60/10* (2023.01)
  *B64U 70/30* (2023.01)
  *B64U 70/83* (2023.01)

(52) U.S. Cl.
  CPC .......... *B64U 10/20* (2023.01); *B64C 29/0025* (2013.01); *B64C 35/008* (2013.01); *B64C 39/12* (2013.01); *B64F 1/027* (2020.01); *B64U 60/10* (2023.01); *B64U 70/30* (2023.01); *B64U 70/83* (2023.01)

(58) Field of Classification Search
  CPC ........ B64F 1/027; B64F 1/0297; B64F 1/029; B64F 1/0299; B64U 70/30; B64U 70/90–93
  See application file for complete search history.

(56) References Cited

U.S. PATENT DOCUMENTS

| | | | | |
|---|---|---|---|---|
| 3,128,972 | A * | 4/1964 | Fonden | B64F 1/027 244/110 R |
| 11,192,646 | B2 * | 12/2021 | Smith | G05D 1/0866 |
| 2009/0294584 | A1 * | 12/2009 | Lovell | B64C 39/024 901/30 |
| 2011/0303789 | A1 * | 12/2011 | Miller | B64F 1/0297 244/110 C |
| 2016/0325849 | A1 * | 11/2016 | Miller | B64F 1/027 |
| 2022/0314864 | A1 * | 10/2022 | Wang | B60P 3/11 |

FOREIGN PATENT DOCUMENTS

KR  20100132395 A * 6/2009

OTHER PUBLICATIONS

Translation of KR 20100132395 A (Year: 2009).*

* cited by examiner

*Primary Examiner* — Richard Green
*Assistant Examiner* — Colin Zohoori
(74) *Attorney, Agent, or Firm* — Frijouf, Rust & Pyle, P.A.

(57) ABSTRACT

Presented is a small, unmanned aircraft systems (aka drone) configured for amphibious use in water environments. Also presented is a capture device for the capture and recovery of a small, unmanned aircraft system.

4 Claims, 24 Drawing Sheets

AMPHIBIOUS SMALL UNMANNED AERIAL AIRCRAFT SYSTEM (ASUMAAS)

CROSS REFERENCE TO RELATED APPLICATIONS

This application claims the benefit of U.S. Provisional Patent Application 63/177,909 filed Apr. 21, 2021.

FIELD OF THE APPARATUS AND METHOD

The invention relates to the field of small, unmanned aircraft systems (aka drone) configured for amphibious use in water environments.

BACKGROUND OF THE INVENTION

In the field of small, unmanned aircraft systems (drone) few are configured for amphibious use in water environments such as lakes, ponds, rivers, oceans, and seas. Water or other liquids can cause shorts in the drone electrical system as well as malfunctions of other drone components. With weight as a critical factor most drones forgo protective hardware and designs which inhibits or prevents water intrusion into areas of the drone. Therefore, there is a need for small, unmanned aircraft systems particularly designed to operate amphibiously and endure extended contact with water or wet fluids.

The Beaufort wind force scale relates wind speed to observed weather conditions at sea (or on land) where 0 represents a calm environment and 8 represents gale force winds ranging from 34-40 knots and 12 represents hurricane force winds. At sea this presents high waves and foam spray of the sea water. There is a need for an amphibious small, unmanned aerial aircraft system which can reliably navigate such a harsh environment and endure at least a Beaufort scale above 7.

Further, recovery of amphibious small, unmanned aircraft systems can be difficult when the recovery vehicle or vessel is not stationary, winds are heavy, or the aircraft includes structural components which may be damaged during landing on a hard surface. There is a need for a recovery device designed particularly for amphibious small, unmanned aircraft systems.

BRIEF SUMMARY OF THE INVENTION

It is therefore an object of the invention to provide an amphibious small unmanned aerial aircraft system (ASUMAAS) which is particularly designed to operate amphibiously and endure extended contact with water or wet fluids and wet environments.

The instant invention has been crafted to withstand the high winds as well as the spray of sea water by the selective positioning if the rotors and, inter alia, the hermetically sealing of the main body while allowing air and fluid flow through the main body from a snorkel air intake strategically positioned slightly higher than the rotors.

Further the instant invention is designed to float on water when necessary and embodiments include additional floatation devices as well as a parachute deployment apparatus to improve the aircraft's survivability under rough and wet conditions.

Additionally, canards and air pressure directed foils are used by the instant invention to minimize or even leverage the air flow and water spray of the rough and wet conditions.

Also, presented herein is a small, unmanned aircraft systems recovery system particularly suited for amphibious aircraft which are designed for aquatic environments and may include components that might be damaged if landed on a hard surface. The recovery system is useable both in water environments (such as at seat) ad well as on land because the recovery system captures the unmanned aircraft prior to contact with the ground or water surface.

Other novel features which are characteristic of the apparatus, as to organization and method of operation, together with further objects and advantages thereof will be better understood from the following description considered in connection with the accompanying figures, in which preferred embodiments of the apparatus are illustrated by way of example. It is to be expressly understood, however, that the figures are for illustration and description only and is not intended as a definition of the limits of the apparatus. The various features of novelty which characterize the apparatus are pointed out with particularity in the claims annexed to and forming part of this disclosure. The apparatus resides not in any one of these features taken alone, but rather in the particular combination of all of its structures for the functions specified.

BRIEF DESCRIPTION OF THE DRAWINGS

The apparatus will be better understood and objects other than those set forth above will become apparent when consideration is given to the following detailed description thereof. Such description refers to the annexed drawings, wherein.

DETAILED DESCRIPTION OF THE INVENTION

Referring now to FIGS. 1-7, an exemplary embodiment is presented of an amphibious small unmanned aerial aircraft system 100 (ASUMAAS). In general, the aircraft 100 of the instant invention is a Vertical Take-Off and Landing (VTOL) aircraft which is designed to utilize 3 or more rotors, including 20 rotors and more.

During operation the amphibious small unmanned aerial aircraft system 100 can be flown remotely using an appropriate ground control station system (GCS) as discussed below.

Figure 1:
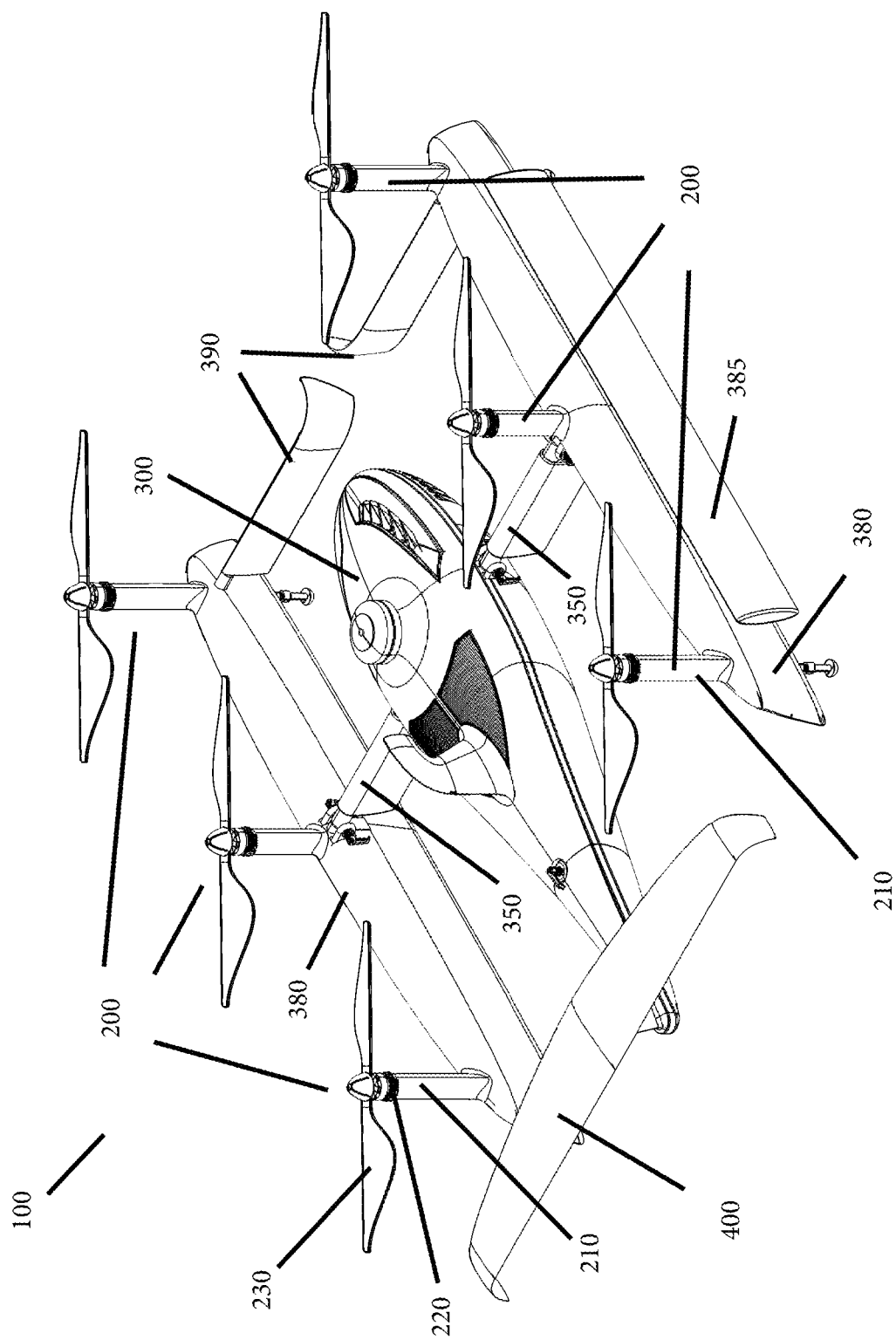
FIG. 1 presents an isometric view of the preferred embodiment of the amphibious small unmanned aerial aircraft system (ASUMAAS).

As shown in at least FIG. 1, the amphibious small unmanned aerial aircraft system of the present invention includes at least: a main body (300), at least a pair of pivotally attached support arms (350) extending from the main body (300); a sponson (380) attached to each support arm (350), wherein the main body (300), support arms (350), and sponson (380) are connected together to form an H-shaped chassis; a rear stabilizer (400) attached to the main body (300); at least one propulsion assembly (200) attached to each sponson (380), each propulsion assembly including a pylon (210) attached to the sponson (380), a motor (220) attached to the pylon (210), and a rotor (230) connected to the motor (220), wherein the pylon length is selected to position the rotor (230) above the rear stabilizer (400).

The rotors (230) may include spinners (not shown) for improved aerodynamics over the rotational center of each motor (220).

The main body (300) includes a radiator grill (307) and plenum (not shown) leading into a sealed bulkhead compartment (not shown) (IP68 level waterproofing) which drains out the hull of the main body (300) in predetermined fluid draining paths (not shown). This acts a ballast while the aircraft 100 is in the water, creating a moderate suction effect to prevent aircraft 100 inversion of the aircraft 100 in high.

The main body (300) is preferably comprised of quasi-isotropic carbon fiber configured to form a clamshell style fuselage. Further, where most practical, other components of the aircraft 100 may also be comprised of quasi-isotropic carbon fiber. Included in the main body is a welded (preferably titanium) H-frame stressed member (not shown) and (preferably titanium) clevis style joints (not shown) interconnecting the H-frame components. Of course, alternate materials may be used for interconnecting the H-frame components.

The hull of the main body (300) is also a flotation device due to its sealed compartments and predetermined fluid draining paths. Further, open spaces within the main body (300) may be filled with foam (such as molded or form fitting Expanded Polypropylene (EPP) foam).

The radiator grill (307) is designed to scoop air while the aircraft 100 is flying and redirect air and water downward when the aircraft 100 is near or at the water line (such as when floating or landing on water) allowing the radiator grill (307) to act simultaneously as a drain.

Figure 6:
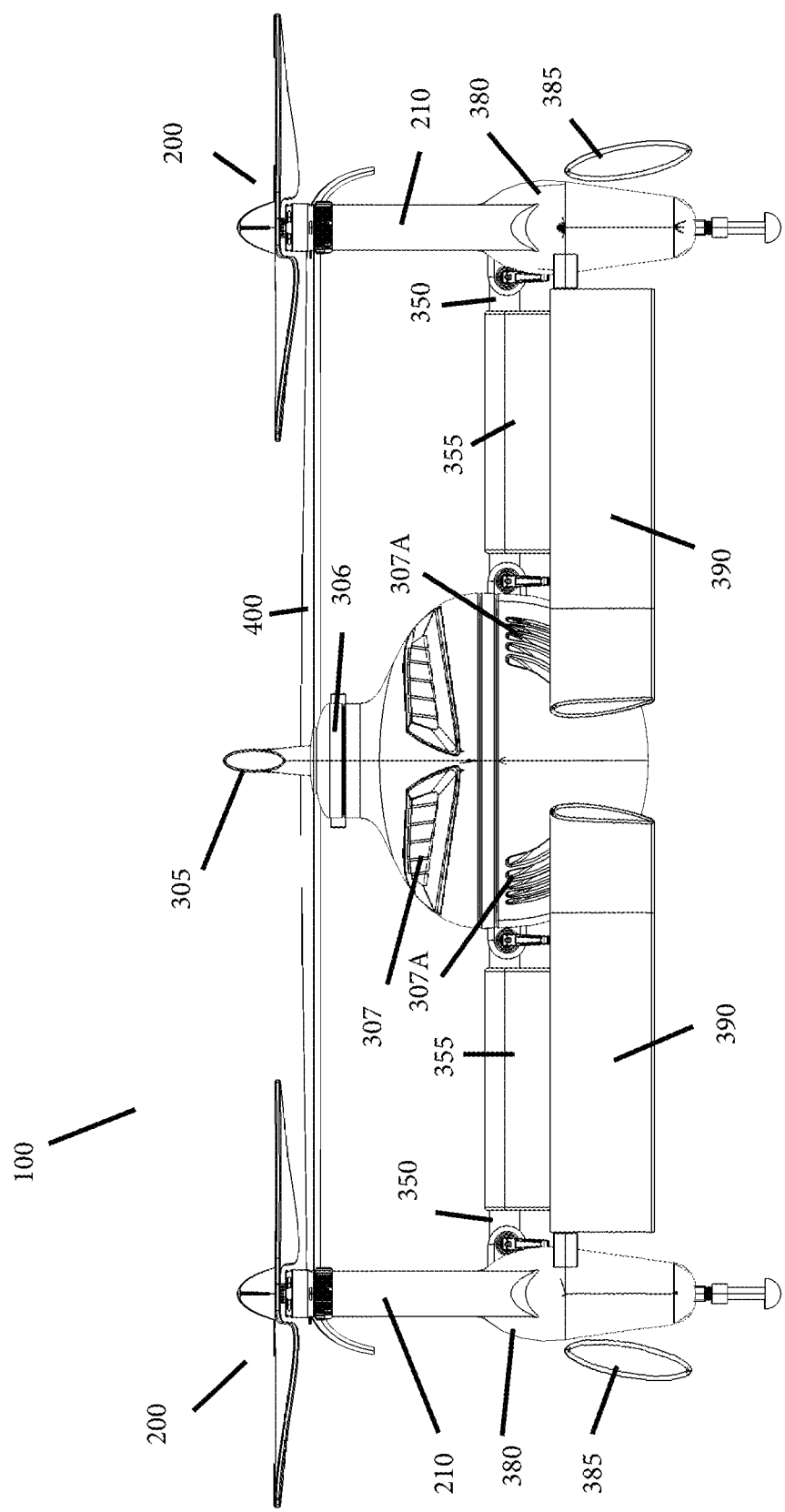
FIG. 6 presents a back view of the preferred embodiment of the amphibious small unmanned aerial aircraft system (ASUMAAS).
Figure 7:
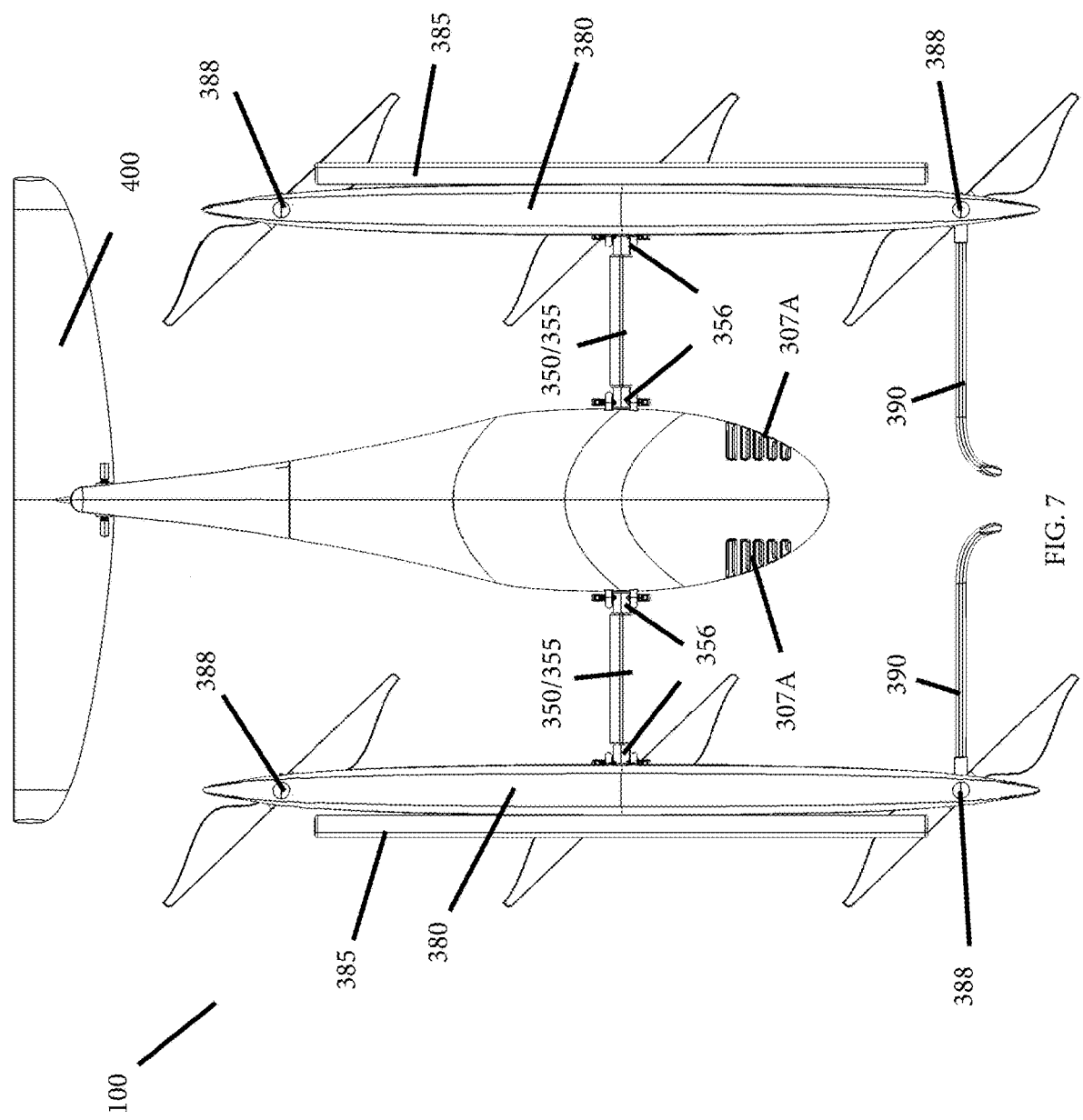
FIG. 7 presents a left bottom of the preferred embodiment of the amphibious small unmanned aerial aircraft system (ASUMAAS).
Figure 8:
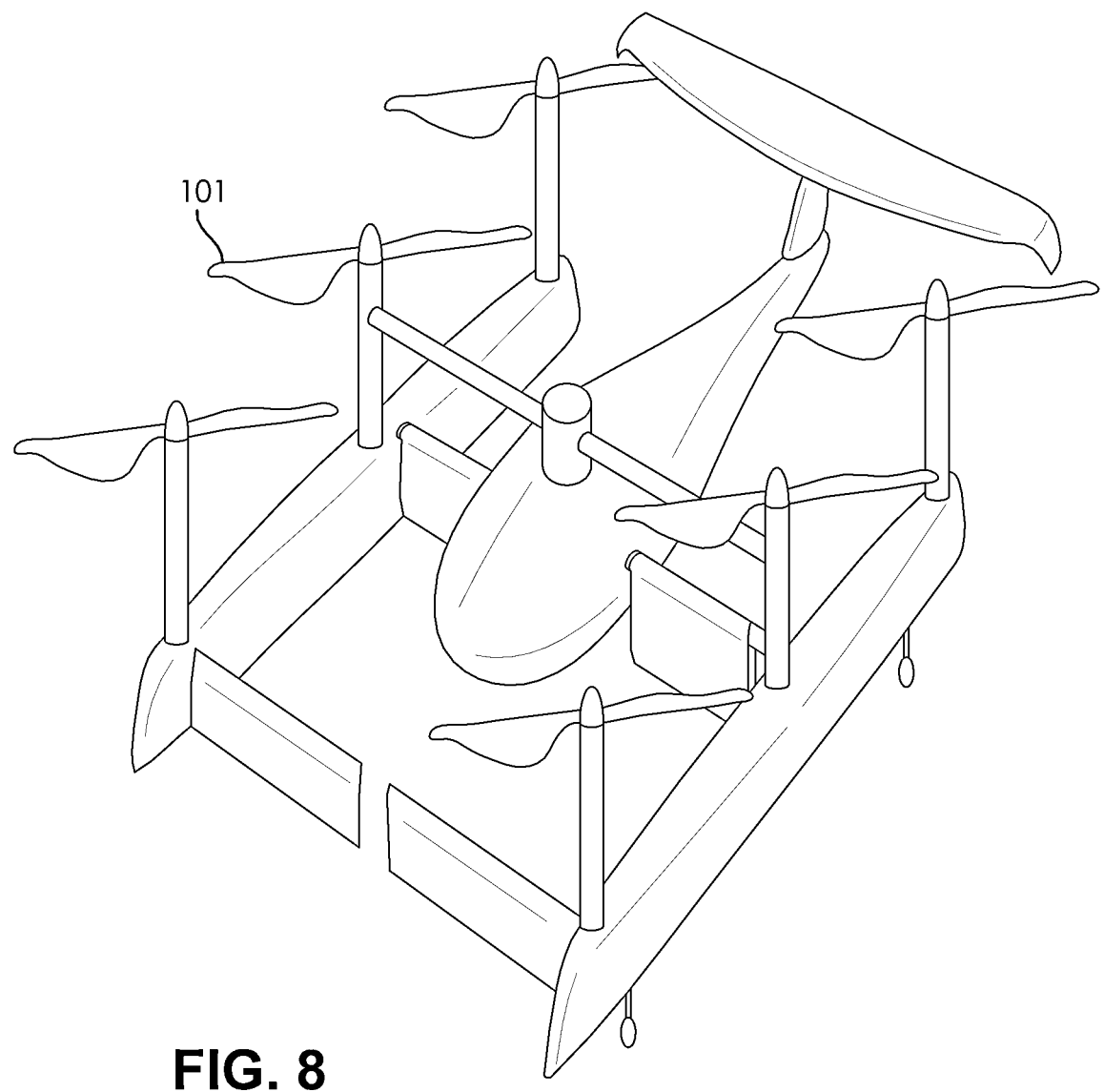
FIG. 8 presents the first alternate embodiment of the amphibious small unmanned aerial aircraft system (ASUMAAS).
Figure 9:
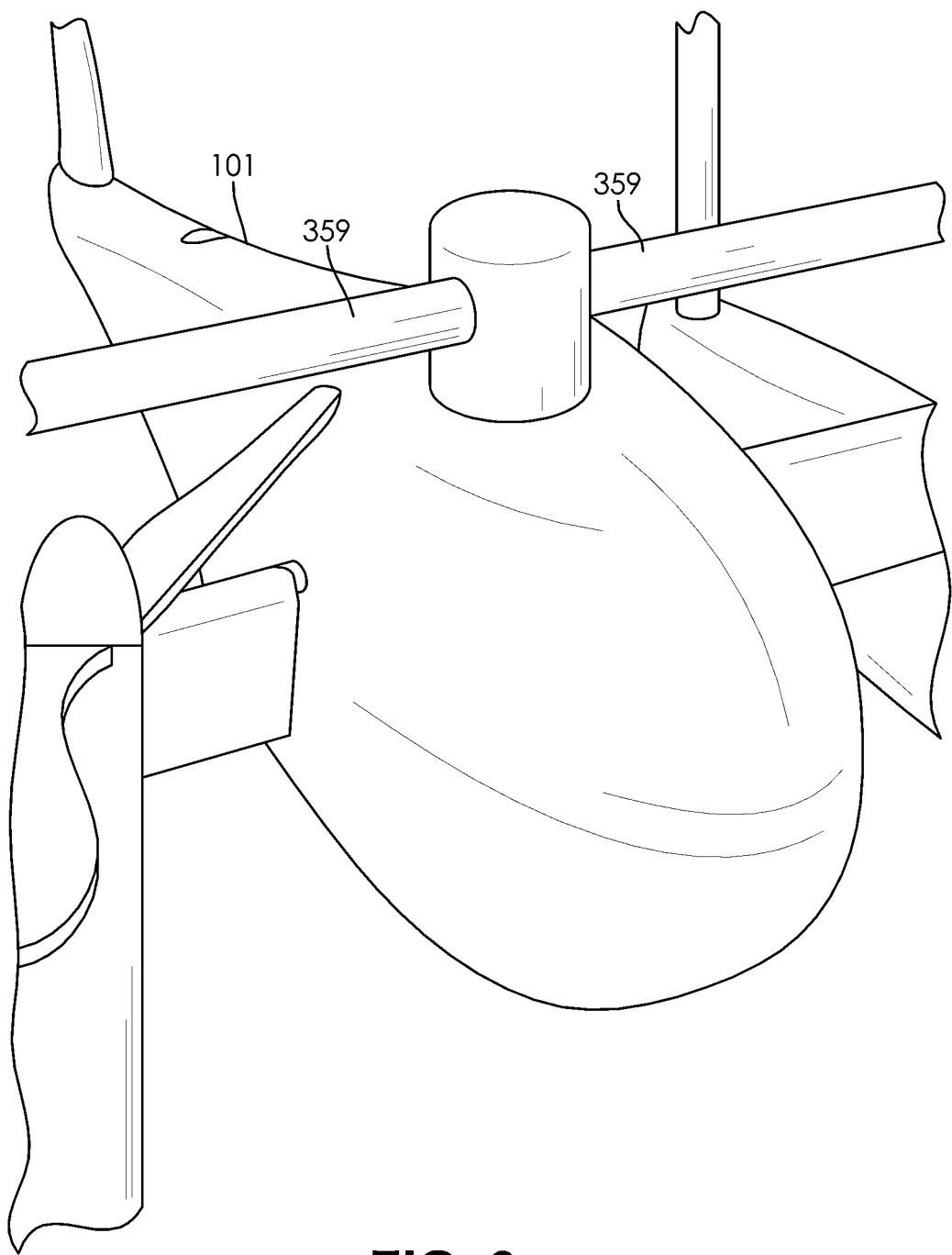
FIG. 9 presents the first alternate embodiment of the amphibious small unmanned aerial aircraft system (ASUMAAS).
Figure 10:
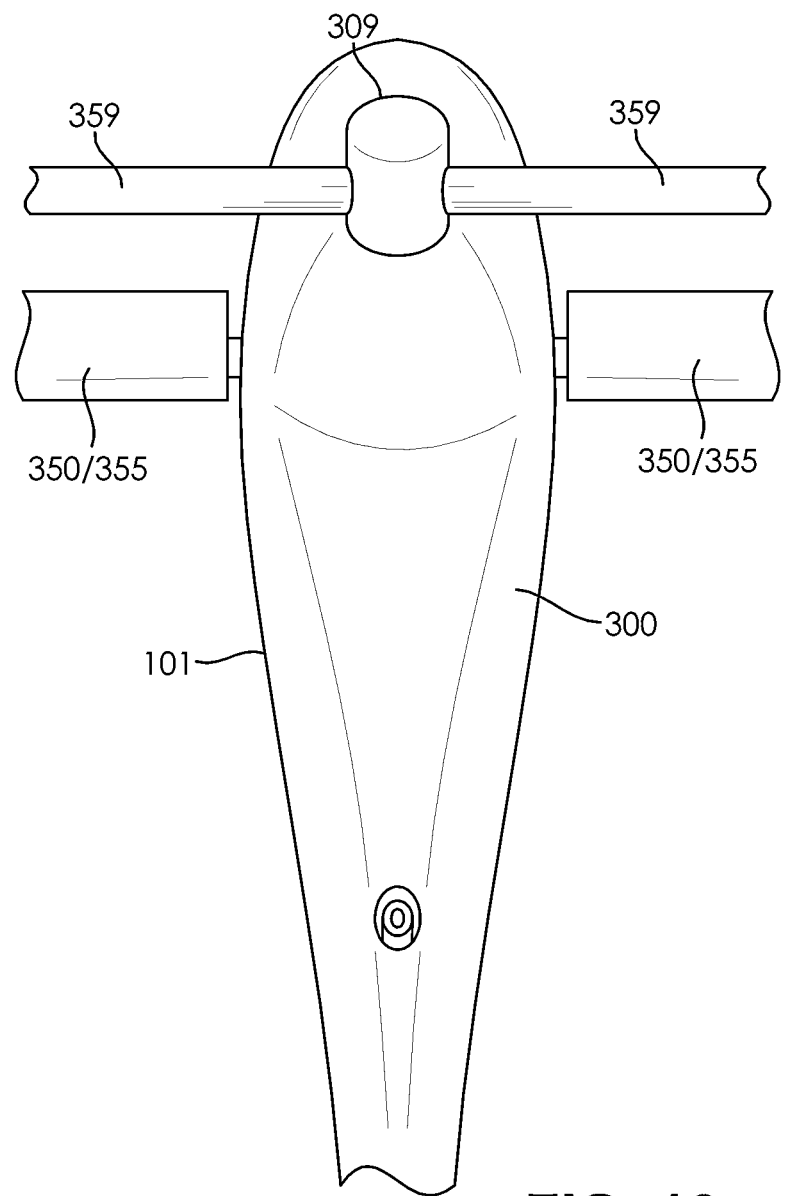
FIG. 10 presents the first alternate embodiment of the amphibious small unmanned aerial aircraft system (ASUMAAS).
Figure 11A:
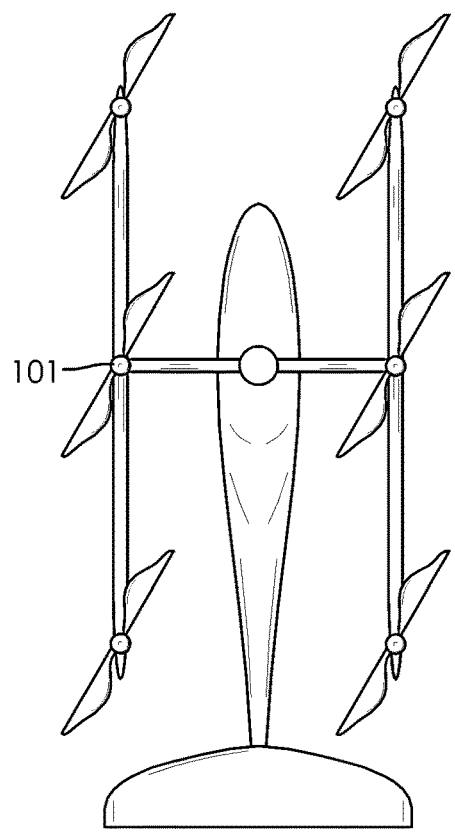
FIG. 11A-11C presents the first alternate embodiment of the amphibious small unmanned aerial aircraft system (ASUMAAS).
Figure 11B:
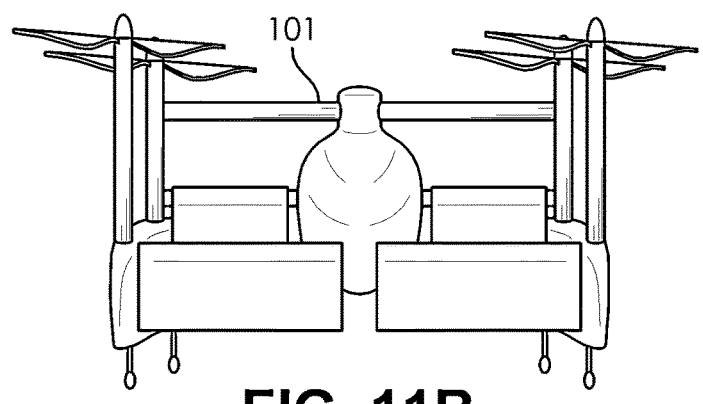
Figure 11C:
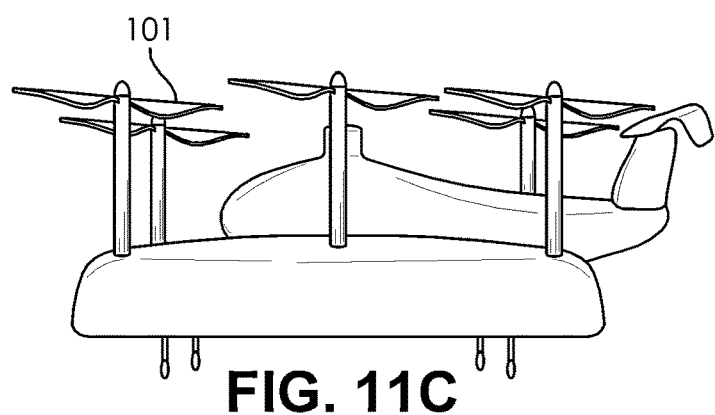

Hull bottom grills (307A) as shown at least in FIG. 6-7 are positioned on the main body (300) below the radiator grill (307) and assist in redirecting air or water downward and acts simultaneously as a drain.

Figure 2:
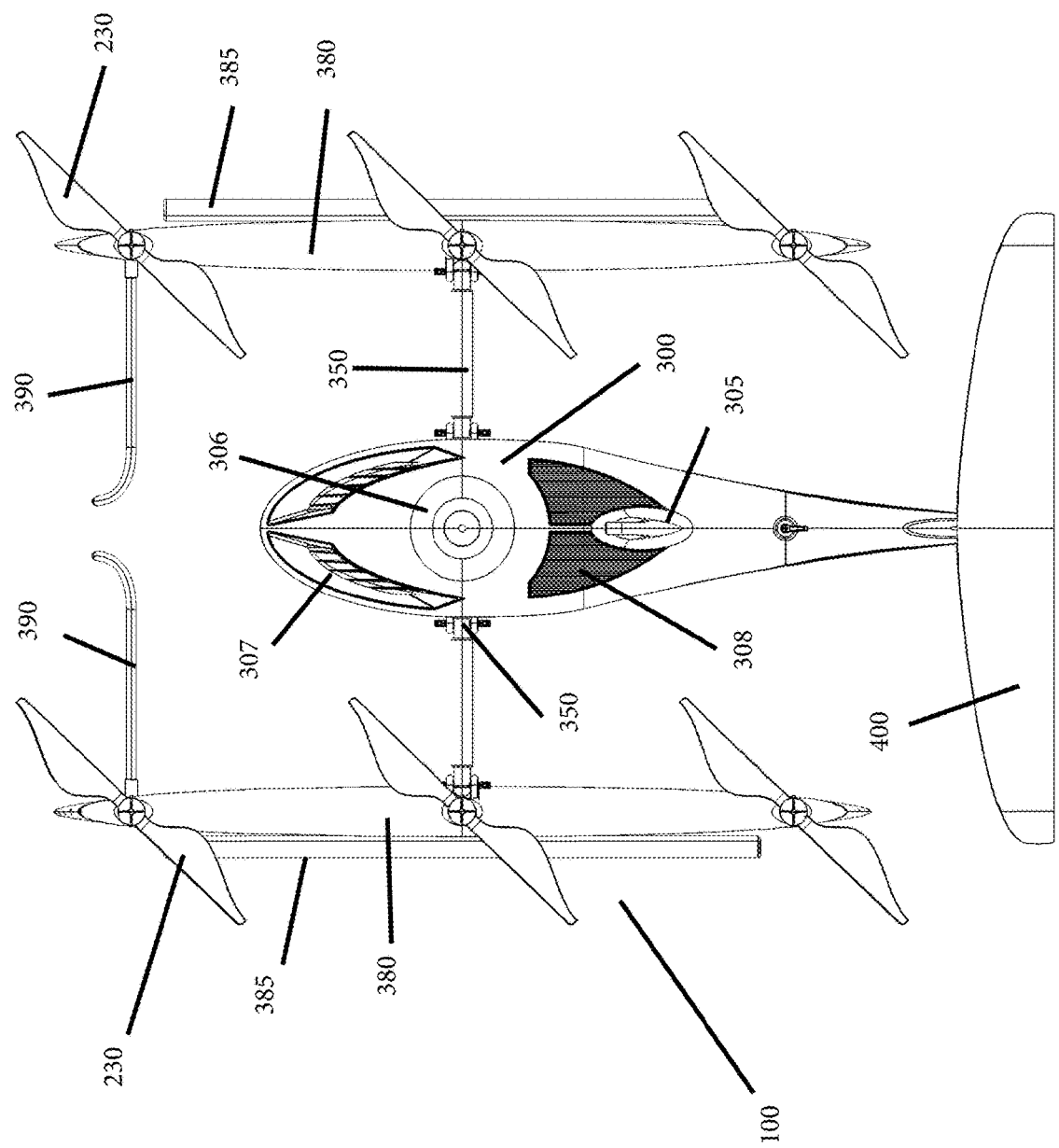
FIG. 2 presents a top view of the preferred embodiment of the amphibious small unmanned aerial aircraft system (ASUMAAS).

The main body (300) further can include heat sinks (308) as shown at least in FIG. 2, provided to cool compartments within the main body containing electronic equipment and other aircraft hardware.

Further, the instant invention provides active cooling through a radiator (not shown) or heat exchanger (not shown) behind the radiator grill (307) as well as passive cooling of the main body (300) through air and water flowing across the main body (300).

The aircraft 100 features a large top mounted engine or cool air intake snorkel (305) positioned on a top surface of the main body (300) and used to prevent or limit sucking in water. In the preferred embodiment of the instant invention the top opening the air intake snorkel (305) is positioned slightly above the top of the rotors (230) to limit the effects the rotors (230) have on the ability to suck air into the air intake snorkel (305).

Heatsinks (not shown) may be added directly below the rotors (230) (propwash area) to allow for natural convection of the heatsinks to cool electronic speed controls (ESC's) for each rotor (230). This configuration allows for the ESC's to be kept near the motors (220), thereby minimizing the need for heavy copper motor cabling.

Figure 3:
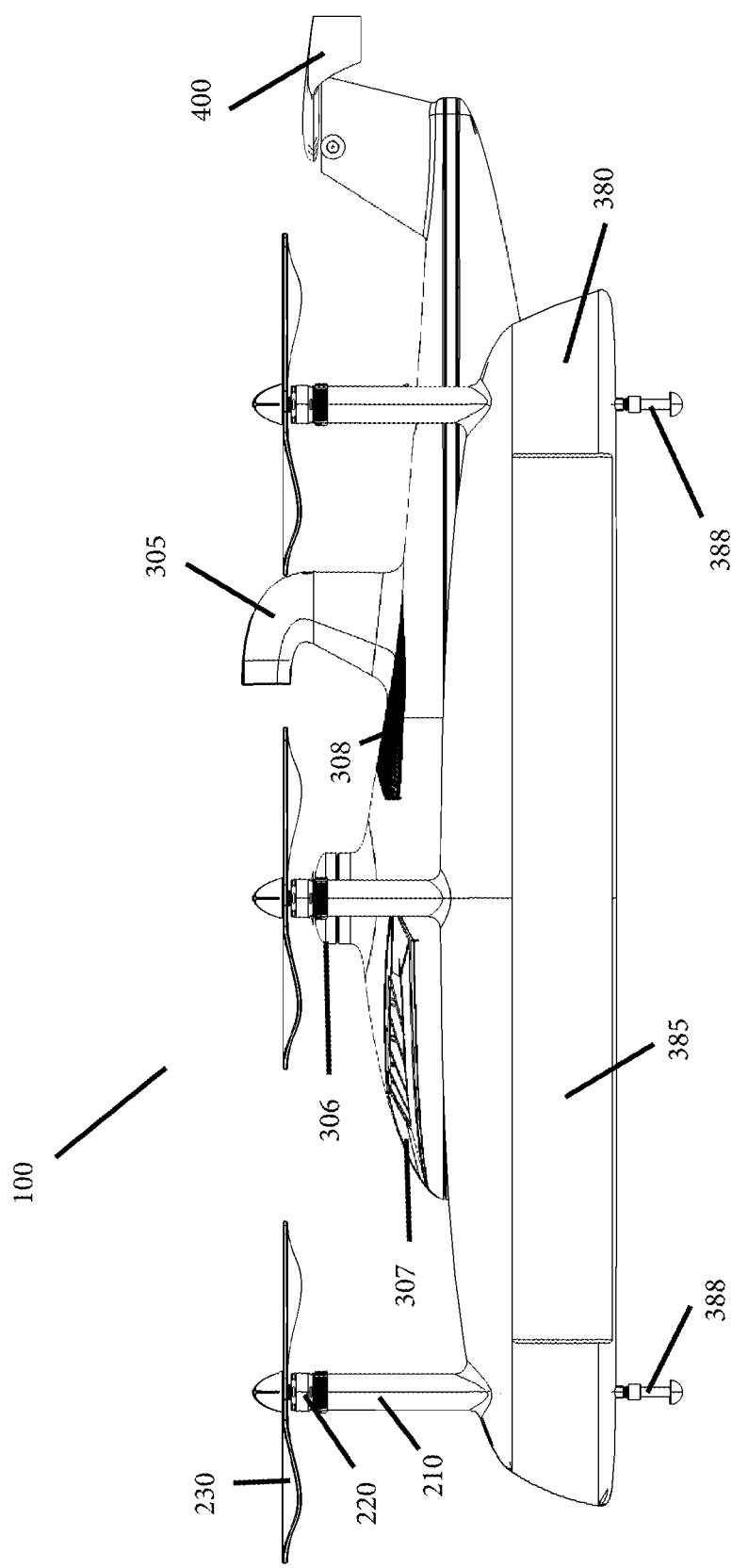
FIG. 3 presents a left view of the preferred embodiment of the amphibious small unmanned aerial aircraft system (ASUMAAS).
Figure 4:
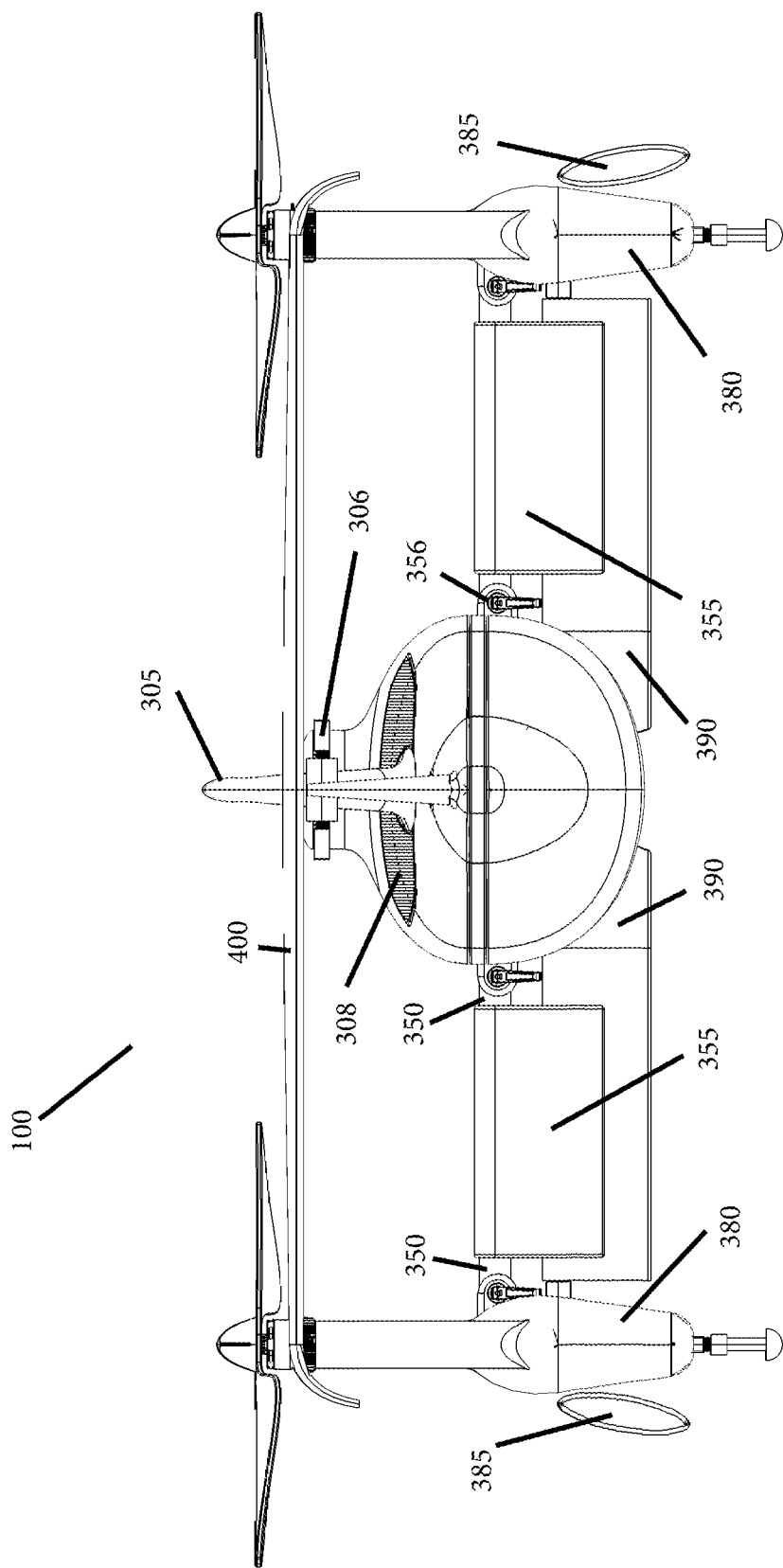
FIG. 4 presents a front view of the preferred embodiment of the amphibious small unmanned aerial aircraft system (ASUMAAS).

As shown in FIG. 3, the pivotally attached support arms (350) extending from the main body (300) include pivoting quick-release booms (356) which provide for both pivoting the support arms (350) as well as disconnection of the support arms (350) from the main body (300).

Further, the pivoting quick-release booms (356) attaching the support arms (350) allows the aircraft 100 to be disassembled and/or folded as need for transportation or storage. The pivoting quick-release booms (356) can be attached to one or both ends of the support arms (350).

Supported by the support arms (350) are airfoil booms (355) which are airfoil that is optionally servo actuated or acts in a passive method to minimize turbulence around the main body (300) and the sponson (380). They are intended to dramatically reduce the drag and noise caused by air turbulence or buffeting of high-pressure air around the various components. The airfoil booms (355) maybe symmetrically or asymmetrically shaped and of equal or different lengths and thickness.

The airfoil booms (355) are mounted near the port and starboard sides of the aircraft main body (300) fuselage and are pivotable titanium booms which are positioned near the sponsons (380) (and can be surrounded by an optional symmetrically crafted airfoil (not shown) that is optionally either servo actuated (motorized) or non-motorized. The non-motorized version of the airfoil booms (355) acts in a passive method as air pressure directed across the foils to minimize turbulence around the main body (300). The airfoil booms (355) are intended to dramatically reduce the drag and noise caused by air turbulence or buffeting of high-pressure air around the various aircraft components.

The sponson (380) attached to each support arm (350) are sealed to prevent water intrusion and can support batteries and electronic equipment to provide power and control to the aircraft systems 100.

Figure 12A:
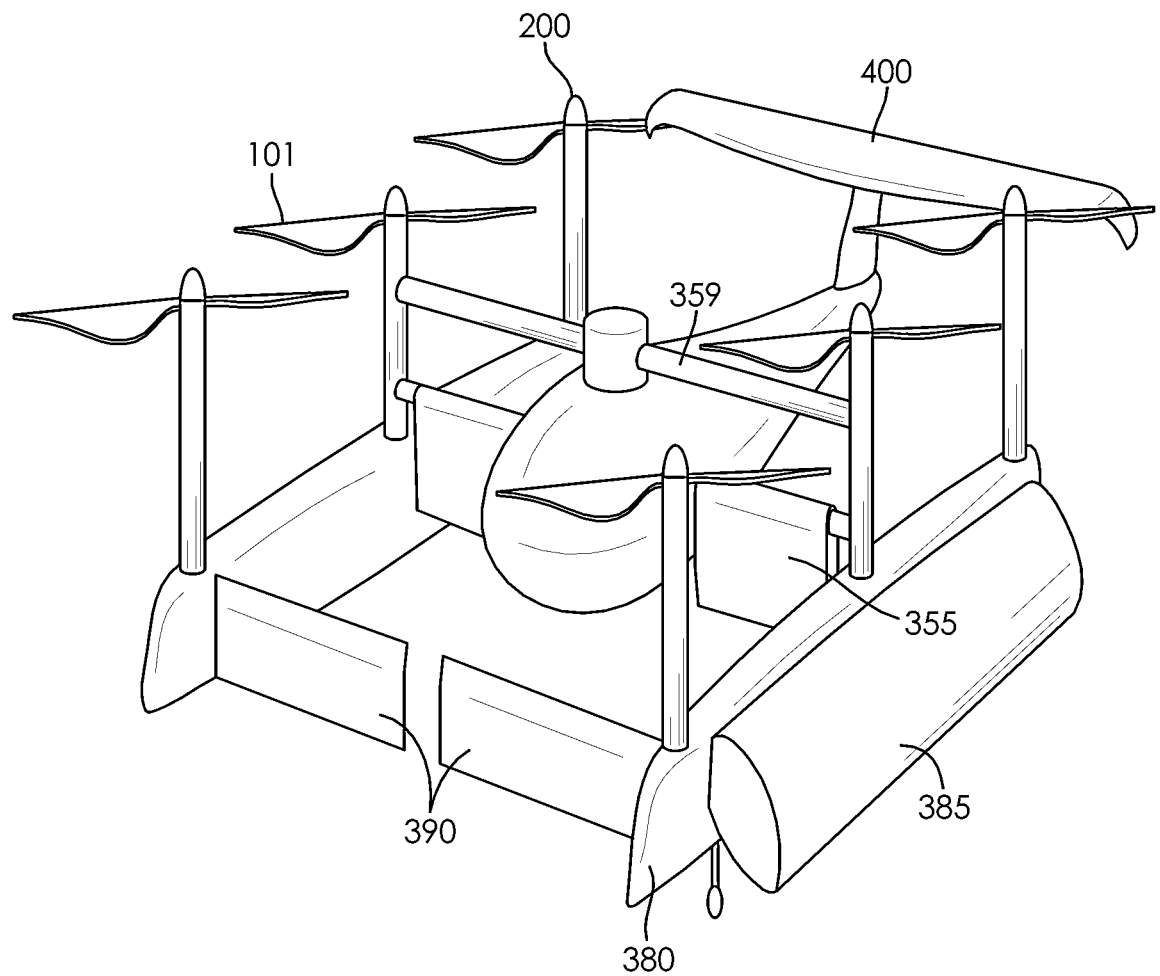
FIG. 12A-12B presents the first alternate embodiment of the amphibious small unmanned aerial aircraft system (ASUMAAS).
Figure 12B:
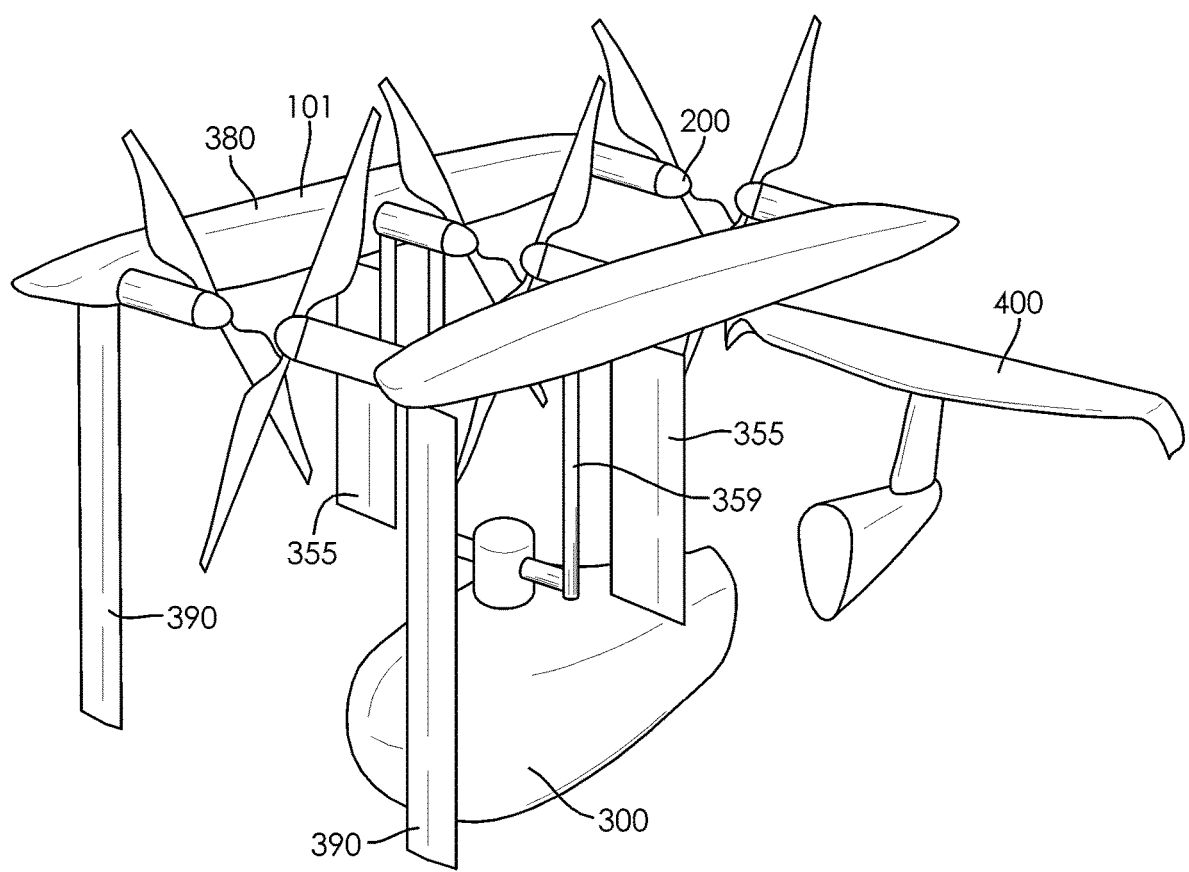

As shown in FIG. 12B the sponsons (380) are configured to articulate into a parallel fashion inline with each other. This feature may utilize pivotal and/or quick release devices such as pivoting the quick-release booms (356) or push buttons (not shown).

The rear stabilizer (400) is releasably attached (such as via push button or clasp—or other known locking mechanism including spring activated locking mechanisms—none of which are shown here) to the main body (300) and acts as a stabilator (combining elevation and stabilization functions). This produces some lift, much like a biplane does or a conventional aircraft does. The rear stabilizer (400) can also be moved up and down to control its angle of attack and is operated similarly in this fashion to aircraft and vehicle canards.

Figure 13:
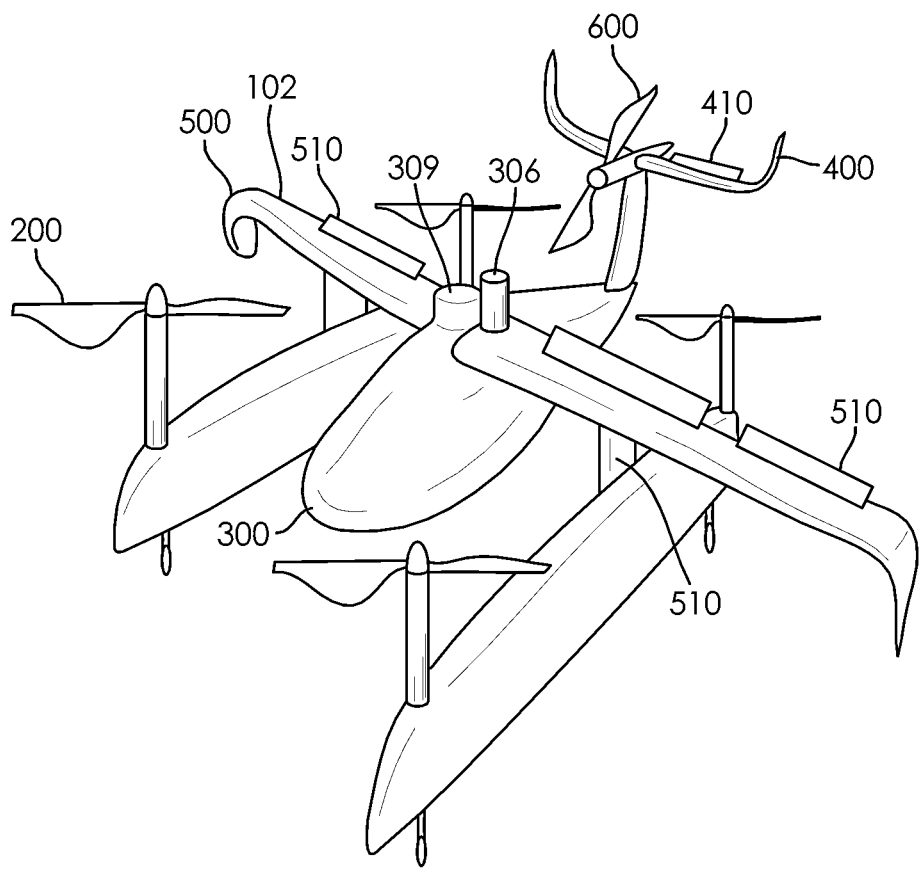
FIG. 13 presents the second alternate embodiment of the amphibious small unmanned aerial aircraft system (ASUMAAS).

The rear stabilizer (400) may also include ailerons (410) for added stability and aircraft control, as shown in FIG. 13. Stabilizer winglets (curved ends of the rear stabilizer (400)) may be used to improve aerodynamic transition during take-off, landing, and altitude changes.

Each least one propulsion assembly (200) attached to each sponson (380) includes a pylon (210) attached to the sponson (380), a motor (220) attached to the pylon (210), and a rotor (230) connected to the motor (220).

The pylon length is selected to position the rotor (230) above the rear stabilizer (400). In contrast to other small unmanned aerial aircraft not suitable for amphibious use, this placement of the rotor (230) places the motor (220) and rotor (230) at a further distance from the bottom of the aircraft 100 which positions it furthest from water beneath the aircraft 100. Additionally, the extended placement of the motor (220) and rotor (230) away from the main body (300) allows for the rotors (230) to direct airflow across the main body radiator grill (307) and other surfaces of the main body (300).

The rotors (230) can be optionally folding and may feature a click-lock style mechanism (not shown) for a fast detach and removal, swap or stowage into a transit case.

Further, the aircraft 100 can be configured as all electric (using both the main body (300) fuselage and exterior sponsons (380) as battery compartments, or configured as a hybrid powerplant, using gas or heavy fuel engine to turn an alternator (not shown) to charge sponsons batteries (not shown) that then power optionally rotors and rotors. It can even be configured as an all gas or all heavy fuel powered aircraft.

In the preferred embodiment of the instant invention canards (390) are optionally attached to the sponsons (380). This is a novel feature on a Vertical Take-Off and Landing (VTOL) aircraft and can be either asymmetrical or symmetrical airfoils. The canards (390) are operated by servos (not shown) and for example, used during attitude mode or when the aircraft 100 is in forward flight pitching a few degrees up slightly more than the attitude/angle of attack. When the aircraft 100 is pitched forward at 300 the canards (390) may go to 320 or even 350 to generate some lift in forward flight. This reduces the amount of energy used to keep the aircraft 100 aloft.

Canard winglets (curved ends of the canards (390)) may be used to improve aerodynamic transition during take-off, landing, and altitude changes.

The aircraft 100 of the instant invention optionally includes at least one inflatable pontoon (385) attached to at least one sponson (380). Preferably each sponson (380) includes at least one inflatable pontoon (385). Sponson (380) may include multiple inflatable pontoons (385) of the same or different size and shape.

The inflatable pontoons (385) are in essence an automatic inflate devices (AFD) similar to personal flotation devices (PFD), which automatically inflates when contacting water for added stability and buoyancy. Basically, upon a triggering event the inflatable pontoons (385) pop out from the sponsons (380) as shown in FIG. 12A. The triggering event may be manual or automatic such as when the aircraft 100 attitude reaches a predetermined limit—suggesting the aircraft 100 is tumbling and a crash is eminent, or a predetermined level of moister (water) is sensed by the aircraft systems 100—suggesting the aircraft 100 is sinking, or other pre-selected criteria for deploying the inflatable pontoons (385). Upon triggering, the inflatable pontoons (385) inflate, for example by triggering a burst of air from a canister which fills the interior of the inflatable pontoons (385)

Provided on a top surface of the main body (300) is an emergency parachute deployment apparatus (306) wherein the emergency parachute deployment apparatus (306) deploys a parachute when the aircraft 100 experiences a predefined amount of tumble, or the parachute is otherwise triggered to deploy. This is deployed in-case of an emergency if the drone were to lose lift and to tumble. The emergency parachute deployment apparatus (306) is launched using means such as a solid fuel rocket motor, pneumatics, or a spring. This feature is preferably (bit optionally) integrated with the main body (300) into to incorporate by design its influence on the main body (300) center of gravity.

Figure 5:
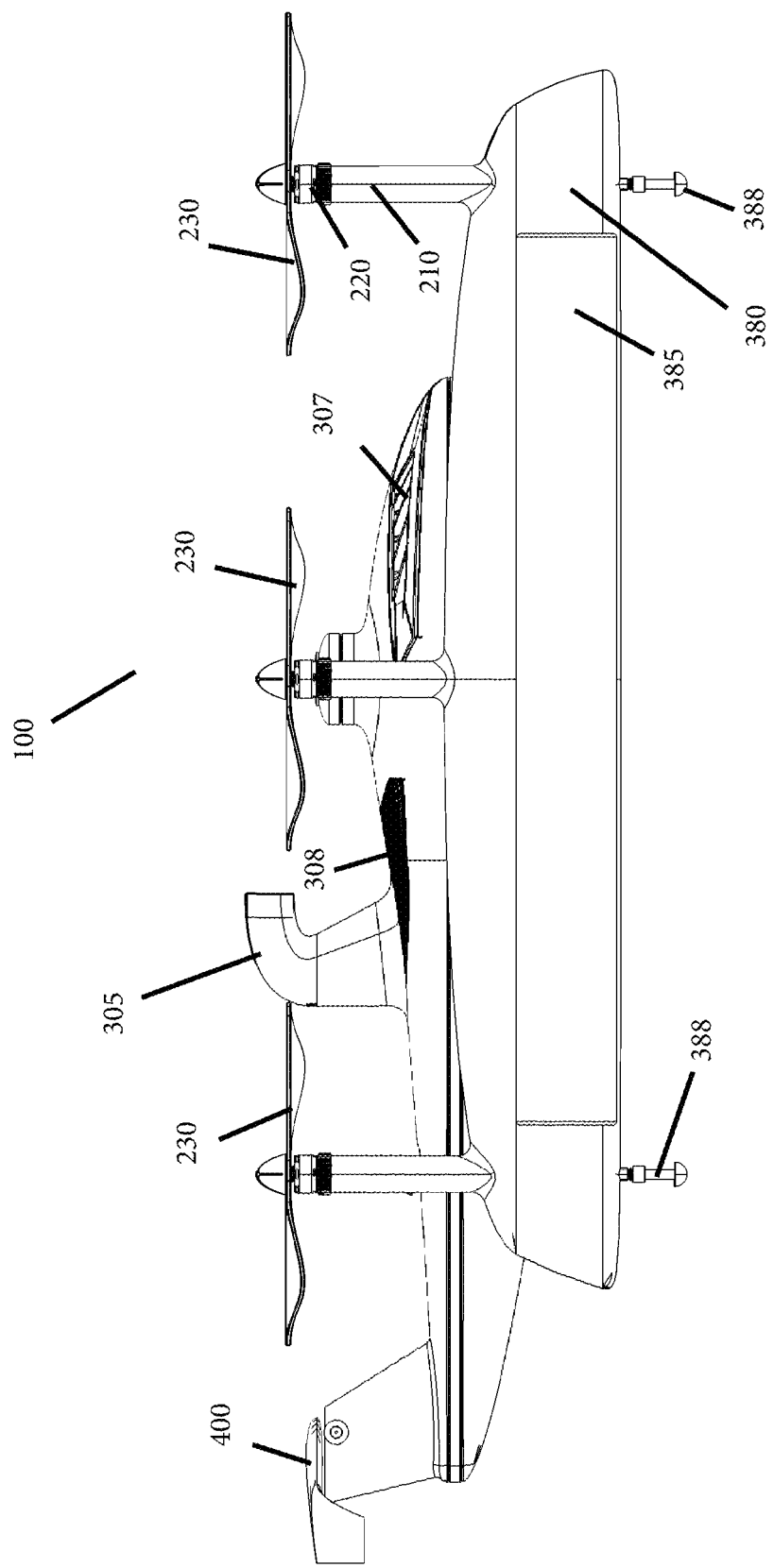
FIG. 5 presents a right view of the preferred embodiment of the amphibious small unmanned aerial aircraft system (ASUMAAS).

The aircraft 100 includes adjustable, telescoping landing skids (388), as shown at least in FIG. 3, FIG. 5, and FIG. 7 on each sponson (380) allowing the aircraft operator to increase the distance between the sponson (380) or main body (300) bottom (payload area) and the ground to carry innumerable payload implements. These skids (388) can telescope up and down within the tubular motor mount (nacelles).

Optionally, two fixed front suspension landing gears (not shown) can be added to the forward part of the sponsons (380) and/or a pivoting tail dragger wheel (not shown) may be attached to the sponsons (380) or main body (300) allowing the aircraft to taxi on the ground or from the deck of a vessel.

It is understood antennae (not shown) can be laminated or otherwise attached to any surface of the aircraft 100 as appropriate.

As shown in FIG. 8-FIG. 12B, the first alternate embodiment 101 of the amphibious small unmanned aerial aircraft system (ASUMAA) includes a support bar (359) extending between a pair of propulsion assemblies (200) and the region of a LIDAR housing unit (309) integrated into a top portion of the main body (300). The support bar (350) enhances the rigidity of the H-shape chassis formed by the support arms (350) and sponson (380). Exemplary performance specification of first alternate embodiment 101 include Wingspan: 169 cm L×193 cm W×48.28 cm H, Installed Power: 10 Kw ×6 configuration, Max Takeoff Weight: 43 kg, Typical Weight: TBD, Empty Weight: 18 kg, Payload: 13.6 (X6 Configuration), Battery Weight: 6.8 kg (X6 Configuration), Main Powerplant Hybrid Heavy Fuel/electric: (TBD), Fuel: JP5, JP8, Jet A-1 (fuel weight TBD), Battery Capacity: TBD batteries ×6 configuration, Hover Tome: 90 to 120 minutes, Max Speed: up to 70 mph, Typical Endurance: 112.6 km, Key Operational Capabilities: amphibious, multi mission capable, multi-role, Unique Features: re-configurable, massive payload, telescoping suspension skids, auto inflate devices, unsinkable.

A particularly unique characteristics of the first alternate embodiment 101 is that it is designed to be easily folded for transportation or storage as shown in FIG. 12B by disconnecting components such as the quick-release booms (356) and the rear stabilizer (400) and folding the rotors (230) using click-lock style mechanisms (not shown) as previously discussed.

The first alternate embodiment (101) of the amphibious small unmanned aerial aircraft system further can be configured to include at least one inflatable pontoon (385) attached to at least one sponson (380), the rear stabilizer (400) the rear stabilizer including ailerons (410); and an emergency parachute deployment apparatus (306) extending from a top portion of the main body (300), wherein the emergency parachute deployment apparatus (306) deploys a parachute when the aircraft experiences a predefined amount of tumble.

Figure 14A:
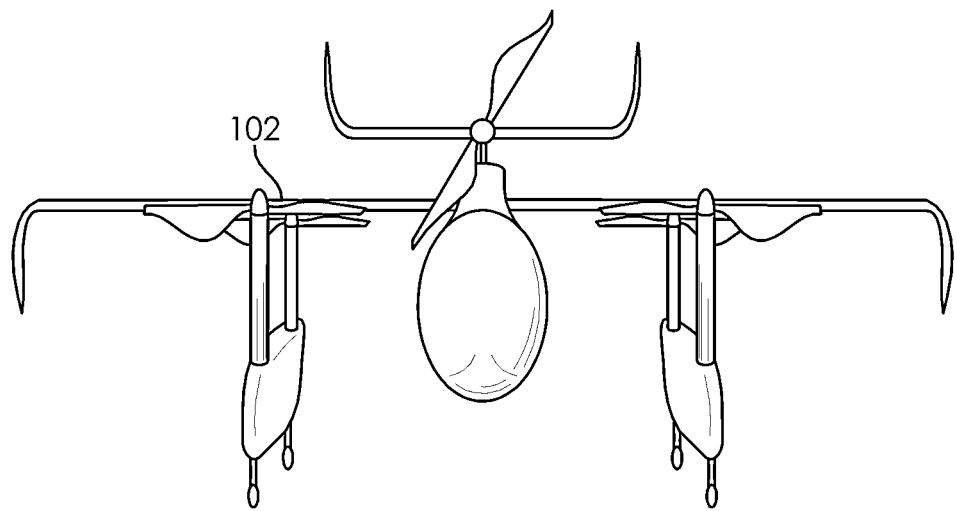
FIG. 14A-14B presents the second alternate embodiment of the amphibious small unmanned aerial aircraft system (ASUMAAS).
Figure 14B:
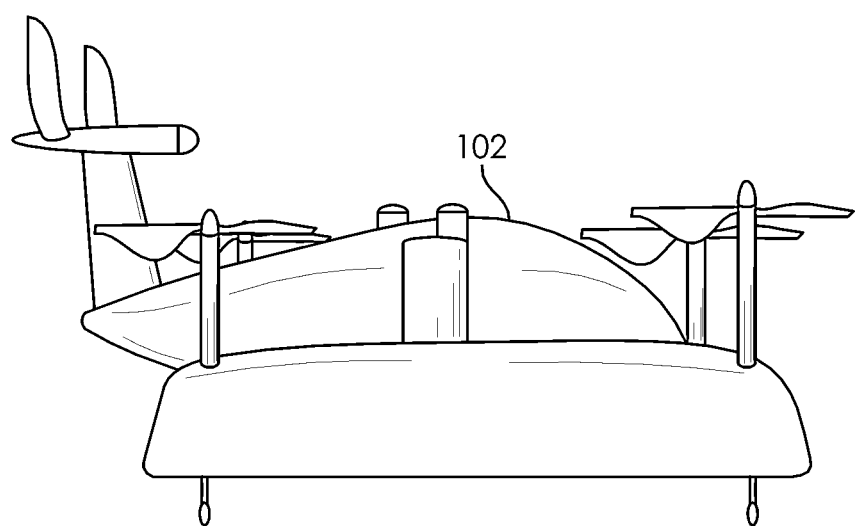

As shown in FIG. 13-FIG. 14 is a second alternate embodiment 102 of the amphibious small unmanned aerial aircraft system (ASUMAA) comprising: a main body (300), a main wing (500) extending from the main body (300); a pair of support structures (520) each extending from the main wing (500) at positions on the left or right side of the main body (300); a sponson (380) attached to each support structures (520); a rear stabilizer (400) attached to the main body (300); at least two propulsion assemblies (200) attached to each sponson (380), each propulsion assembly including a pylon (210) attached to the sponson (380), a motor (220) attached to the pylon (210), and a rotor (230) connected to the motor (220), wherein the pylon length is selected to position the rotor (230) above the rear stabilizer (400), and a tail propeller (600) extending from the rear stabilizer (400) in a direction perpendicular to the rotation axis of the rotors (230).

The second alternate embodiment 102 of the amphibious small unmanned aerial aircraft system further can be configured to include at least one inflatable pontoon (385) attached to at least one sponson (380), wherein the main wing (500) includes main wing ailerons (510) and the rear stabilizer (400) includes rear stabilizer ailerons (410); and an emergency parachute deployment apparatus (306) extending from a top portion of the main body (300) and/or a LIDAR housing unit (309) integrated into a top portion of the main body (300).

It is understood the first and second alternate embodiment 101/102 can be combined with any of the features presented on the preferred embodiment (and vice versa) therefore the following discussion highlights mainly some of the unique characteristics of the first alternate embodiment 101.

Aircraft Recovery Apparatus

Figure 15:
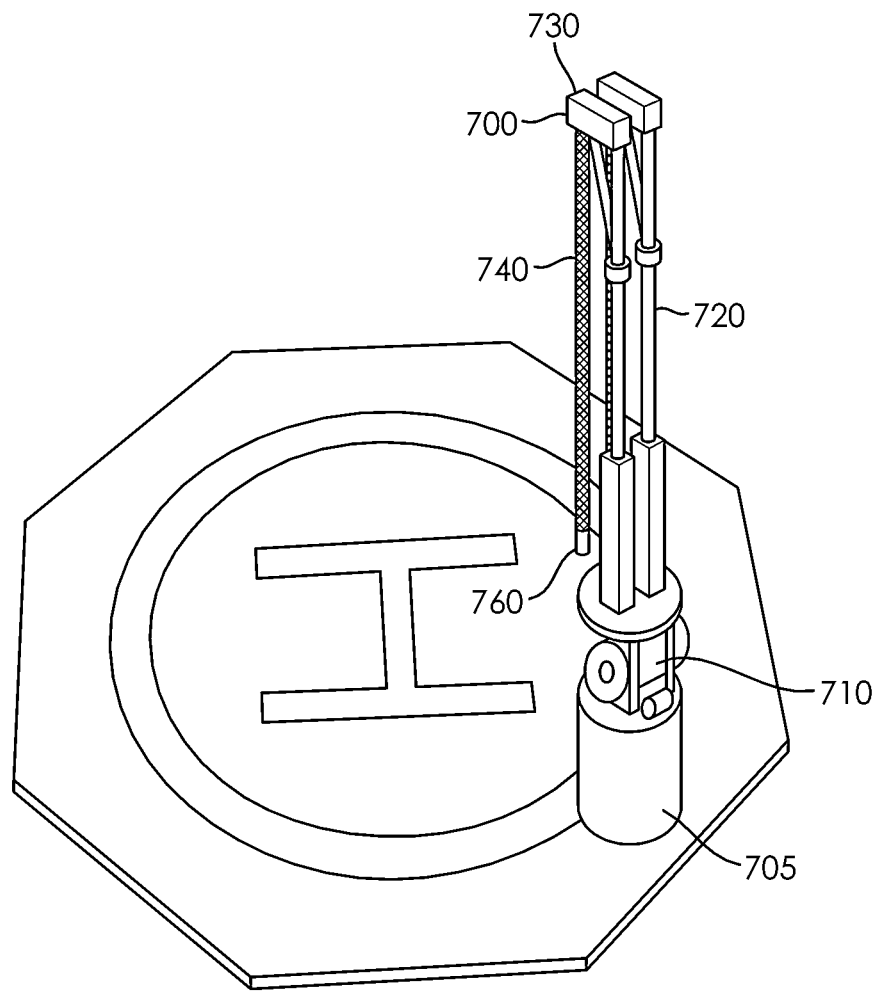
FIG. 15-FIG. 19 presents a preferred embodiment of an aircraft recovery apparatus.
Figure 16:
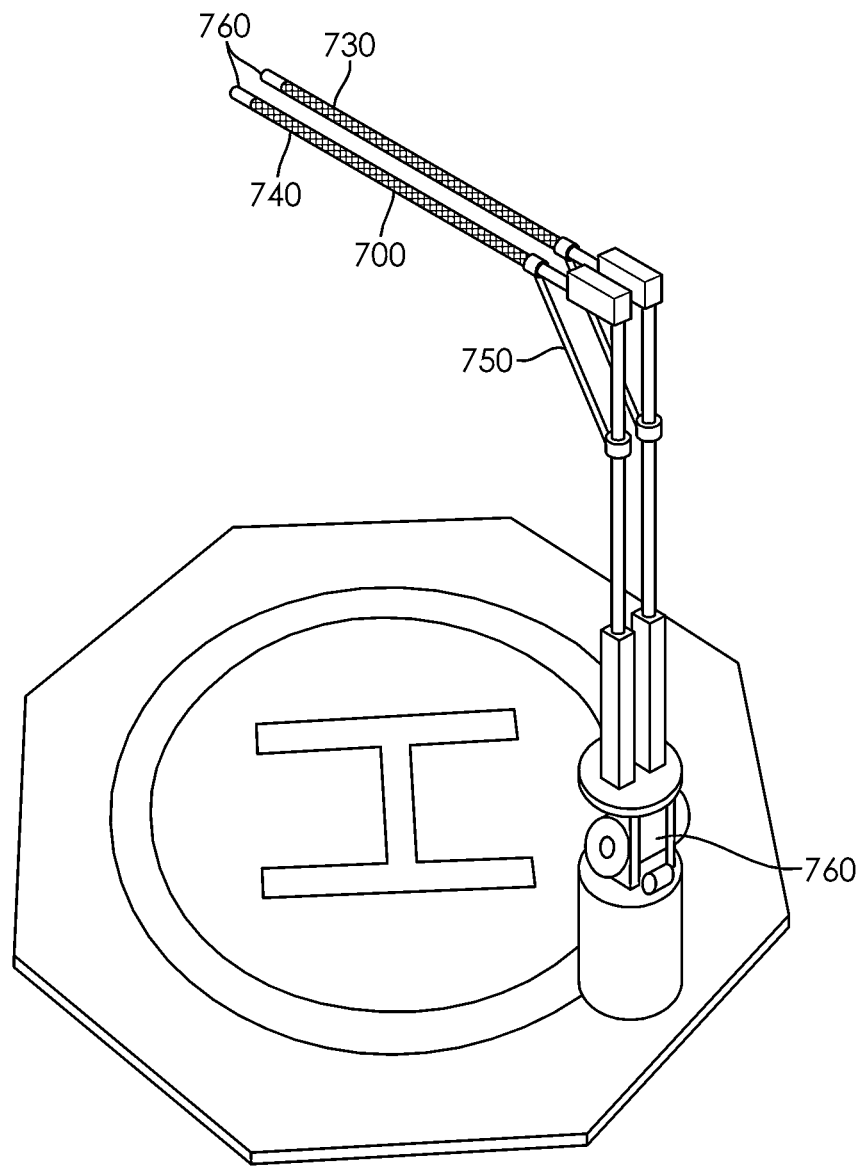
Figure 17:
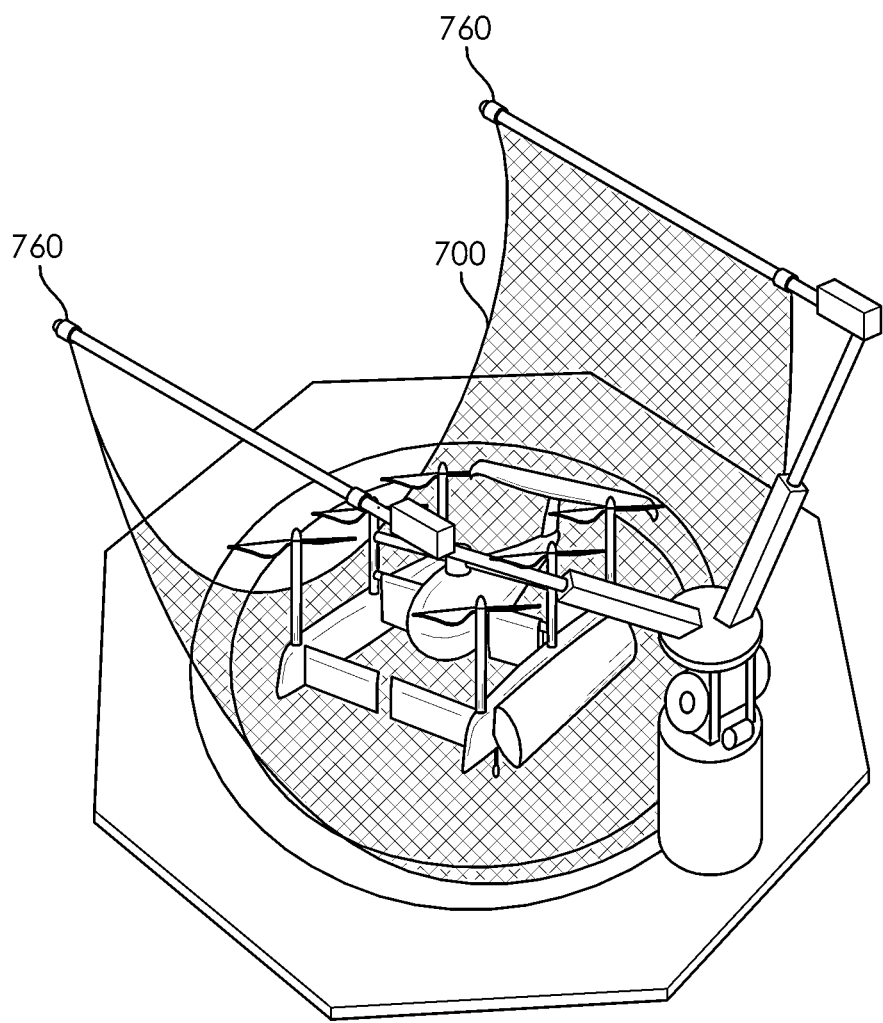
Figure 18:
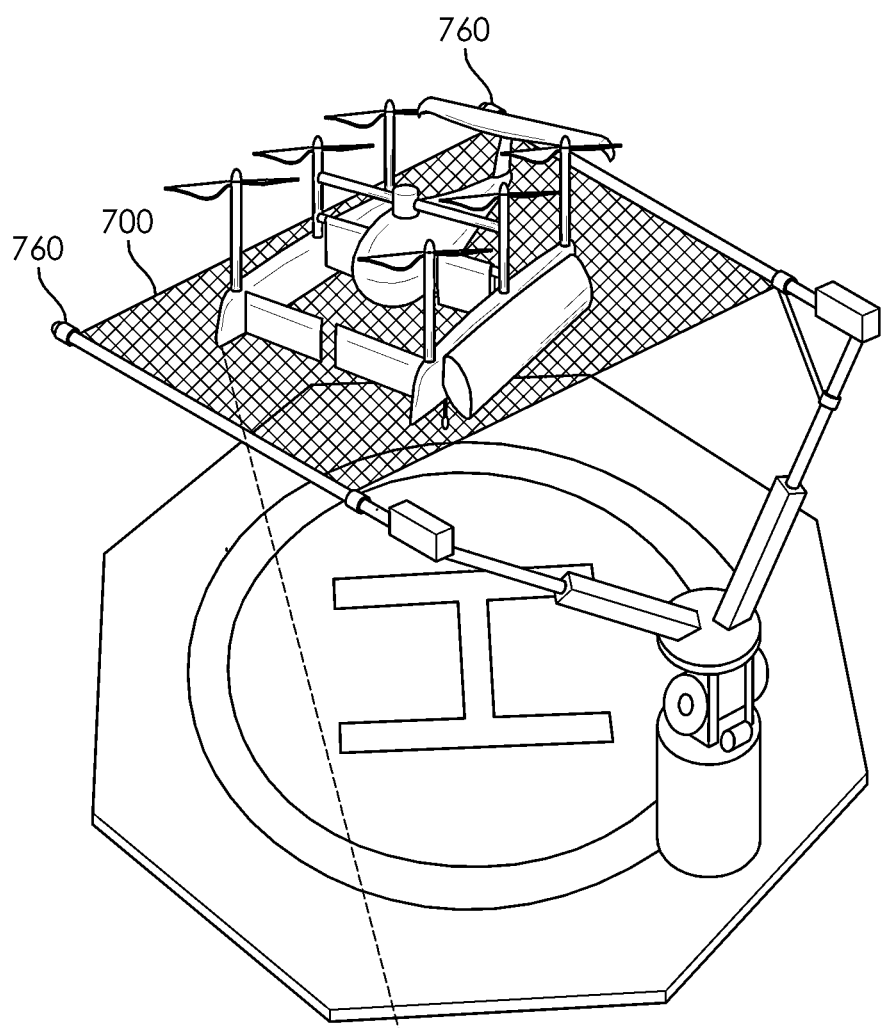
Figure 19:
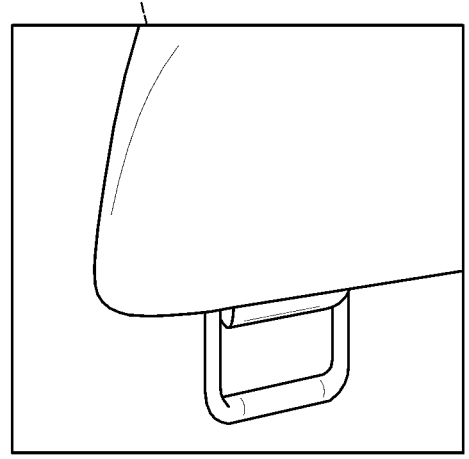
Figure 20:
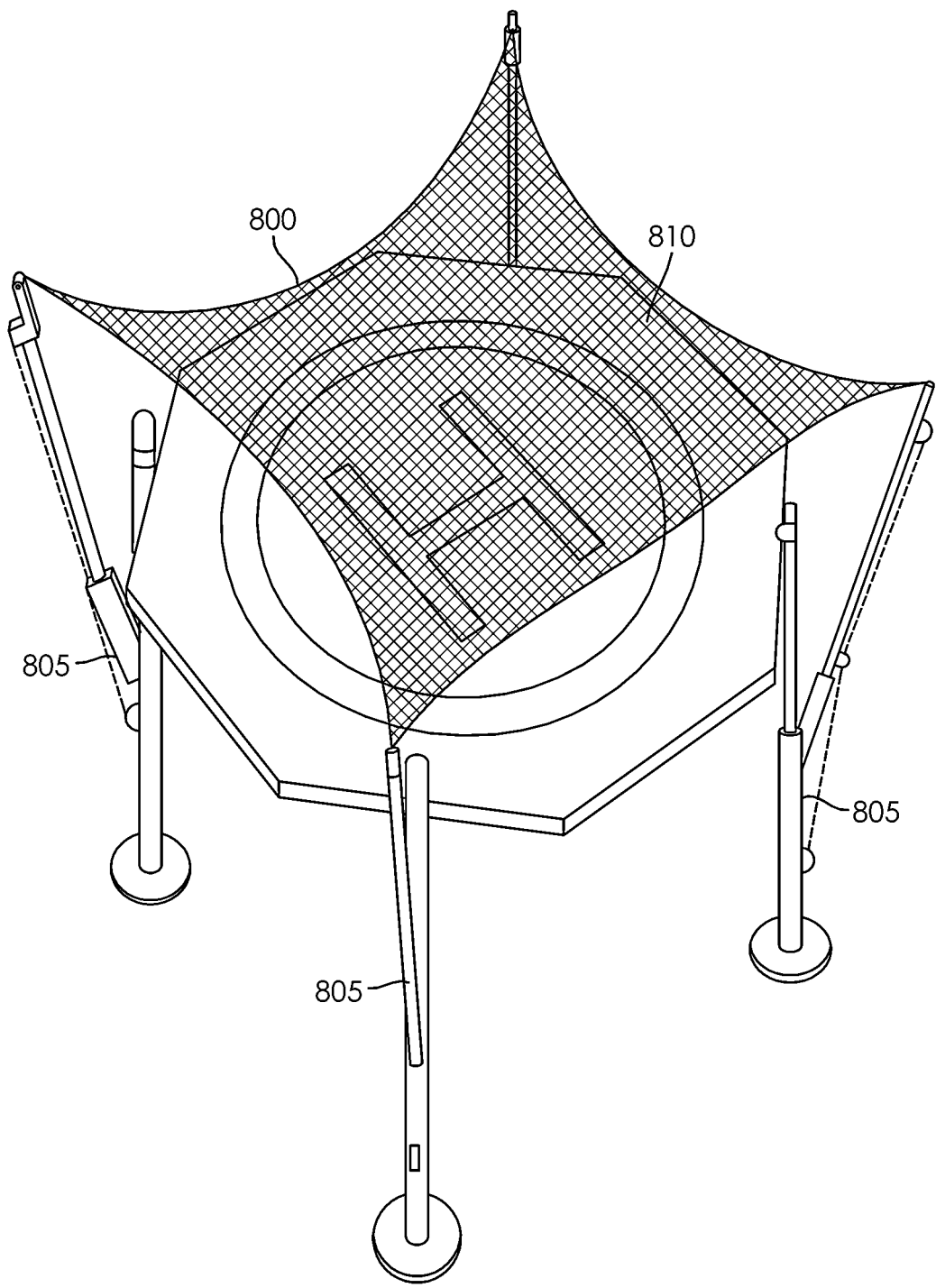
FIG. 20-FIG. 24 presents an alternate embodiment of an aircraft recovery apparatus.
Figure 21:
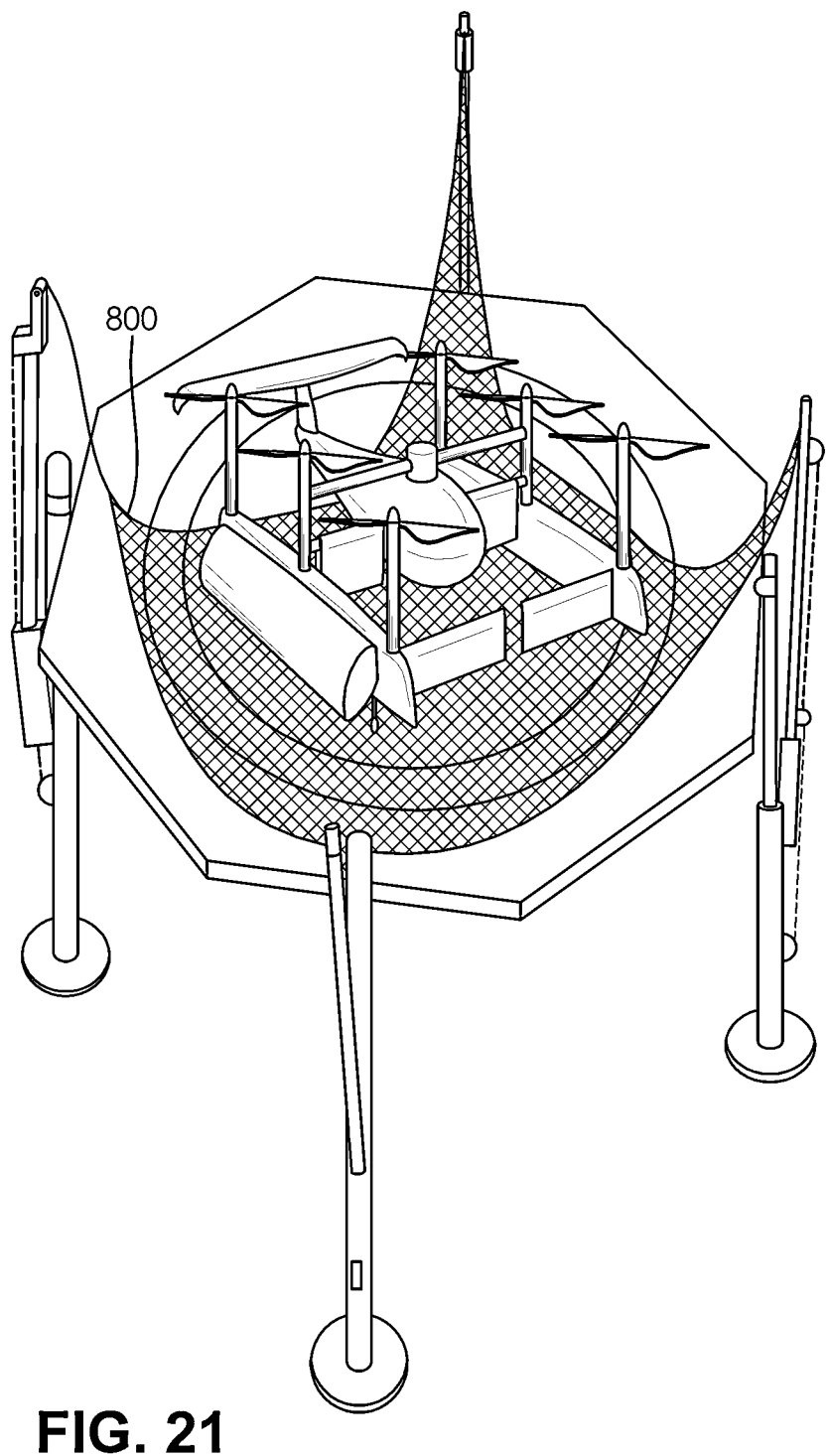
Figure 22:
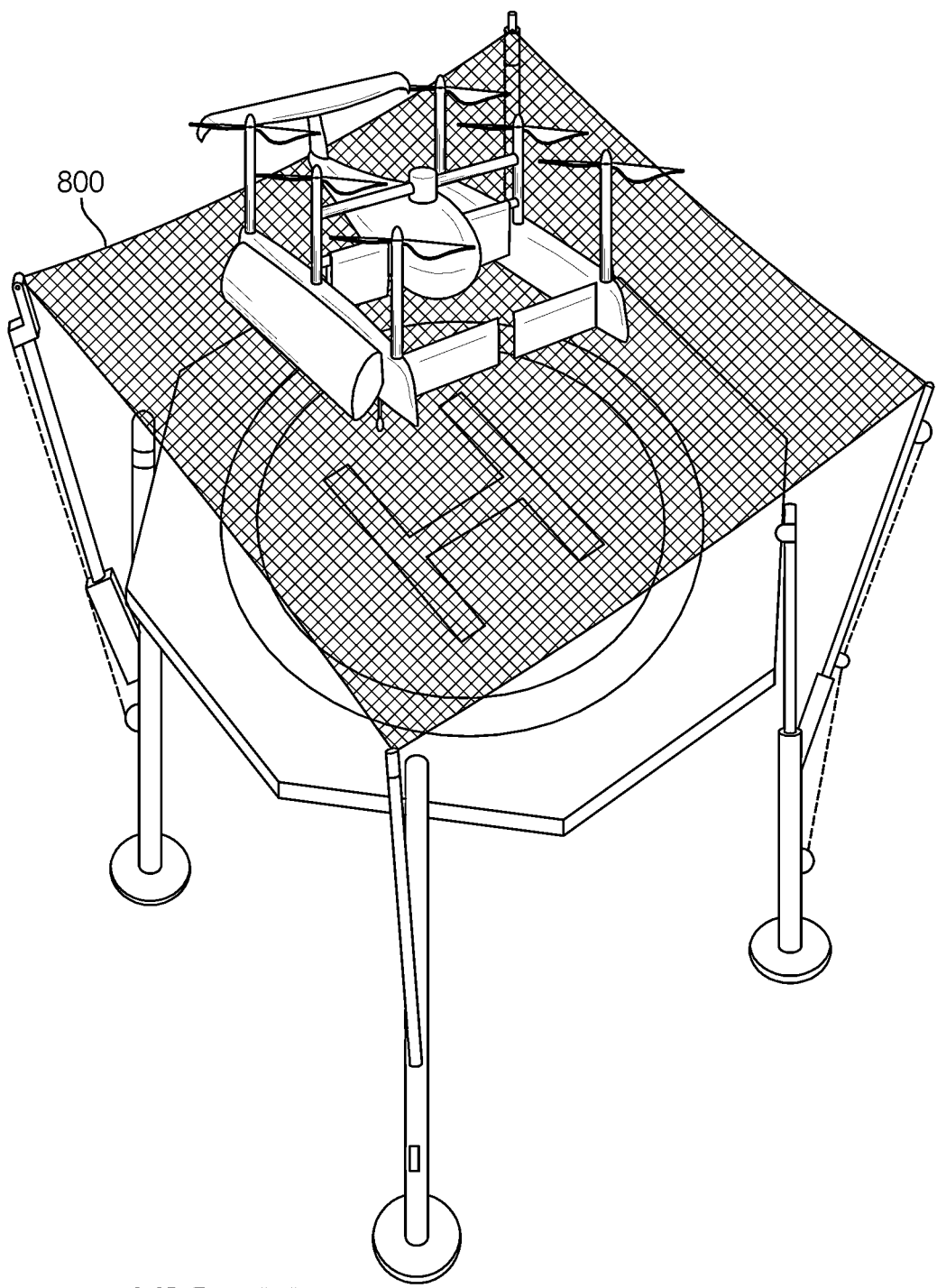
Figure 23A:
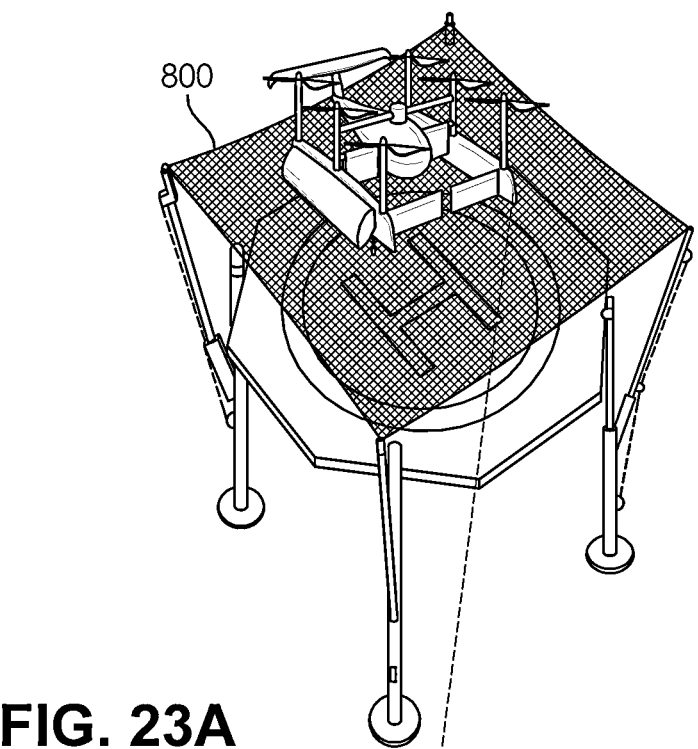
Figure 23B:
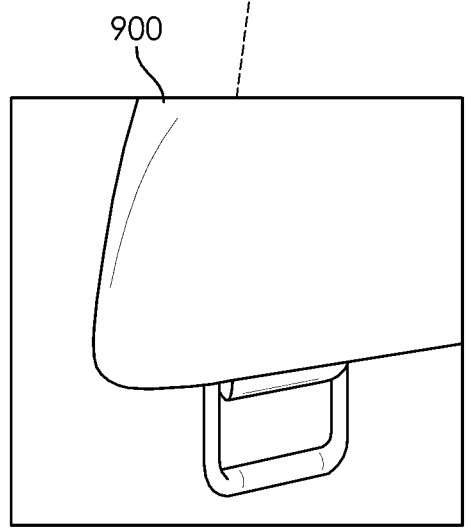
Figure 24:
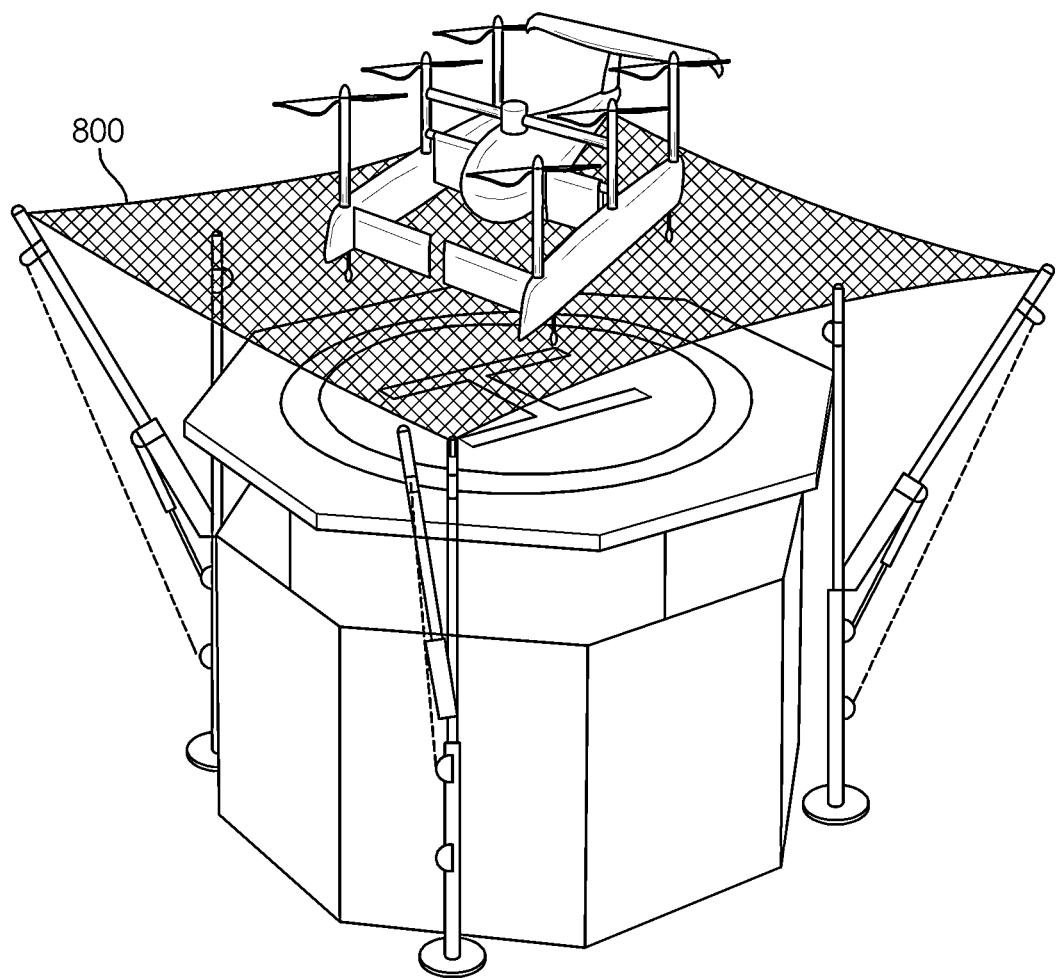

Further, as shown in FIG. 15-FIG. 19 is a preferred embodiment of an aircraft recovery apparatus (700) for aircraft having a carabiner positioned on an external surface of the aircraft comprising; a bottom plate (705) to bolt to an attaching surface or the ground; a support base (710) attached to the bottom plate (705); support rods (720) extending from the support base (710); a pair of articulated pole extensions (730) pivotally attached to the support rods (720); powered actuators (750) connected between the support rods (720) and the articulated pole extensions (730); a net (740) expendably extending between the articulated pole extensions (730), wherein the net (740) is configured to seat within the clasp of the carabiner positioned on an external surface of the aircraft. The net (740) is rolled up on each post (730) by yellow end-effector/stepper or hydraulic motors (760) for easy storage. Also, keeps net from getting tangled while in operating windy conditions. FIG. 15 illustrates the crane including a single crane operation, net is rolled up on pole for compact design, winch winds and releases net, hydraulic arms extend poles for launch and landing drone, titanium rods for maximum strength. The powered actuators (750) extend the net (740). The powered actuators (750) may include hydraulically, electrically or pneumatically powered. The net (740) is unrolled as the articulated pole extensions (730) are spread apart. A winch (760) assists the net (740) in expending or contracting. The bottom plate (705) may be bolted to the deck of a boat. The pole may extend net (740) up to 2× over platform area. The net (740) may be constructed of Kevlar. FIG. 15 illustrates the aircraft recovery apparatus (700) in a storage position. FIG. 16 illustrates the aircraft recovery apparatus (700) in a net operation position wherein the poles (730) extend in top position to prepare for extension of net (740). More specifically, the poles (730) extend up and prepare to expand to open net. Net (740) is rolled up on each pole for easy storage and keeps net (740) from getting tangled in operating wind conditions. FIG. 17 illustrates the aircraft recovery apparatus (700) in a position to launch the drone wherein during launch mode the net is under no tension allowing the drone to take off from platform. More specifically, the poles (730) are in top position to relieve tension on net (740). FIGS. 18 and 19 illustrates the aircraft recovery apparatus (700) in a position to land the drone wherein in landing mode the net (740) is under full tension allowing maximum area to land drone. More specifically, the poles (730) extend to maximum position and net (740) is in full extension for catching drone. In landing mode the carabiners lock drone into net. More specifically, the carabiners on bottom side of the drone lock into the net for securing landing.

As shown in at least FIG. 20-FIG. 24 is an alternate embodiment of a landing platform.

In this embodiment the landing platform comprises a plurality of posts (805) which support a net (810) for capturing the aircraft.

There has thus been broadly outlined the more important features of the apparatus in order that the detailed description thereof that follows may be better understood, and in order that the present contribution to the art may be better appreciated. There are, of course, additional features of the apparatus that will be described hereinafter and which will form additional subject matter of the claims appended hereto. Those skilled in the art will appreciate that the conception upon which this disclosure is based readily may be utilized as a basis for the designing of other structures, methods, and systems for carrying out the several purposes of the present apparatus. It is important, therefore, that the claims be regarded as including such equivalent constructions insofar as they do not depart from the spirit and scope of the present apparatus.

Further, the purpose of the Abstract is to enable the national patent office(s) and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the apparatus of this application, which is measured by the claims, nor is it intended to be limiting as to the scope of the apparatus in any way.

The foregoing disclosure is sufficient to enable one having skill in the art to practice the apparatus without undue experimentation and provides the best mode of practicing the apparatus presently contemplated by the inventor. While there is provided herein a full and complete disclosure of embodiments of this apparatus, it is not intended to limit the apparatus to the exact construction, dimensional relationships, and operation shown and described. Various modifications, alternative constructions, changes, and equivalents will readily occur to those skilled in the art and may be employed, as suitable, without departing from the true spirit and scope of the apparatus. Such changes might involve alternative materials, components, structural arrangements, sizes, shapes, forms, functions, operational features, or the like. Elements of the instant apparatus may be made from a variety of known materials including wood, rubber, metal, or plastic, as well as from any suitable combination of appropriate materials.

It is understood the methods disclosed herein present the system and components which can form the apparatus for performing the methods as claimed and as disclosed. Further the use of the apparatus and system components presented herein can form the basis for the methods presented and claimed herein.

Accordingly, the proper scope of the present apparatus should be determined only by the broadest interpretation of the appended claims so as to encompass all such modifications as well as all relationships equivalent to those illustrated in the drawings and described in the specification.

What is claimed is:

1. An aircraft recovery apparatus (700) for aircraft having a carabiner positioned on an external surface of the aircraft comprising:
    a bottom plate (705) to bolt to an attaching surface or the ground;
    a support base (710) attached to the bottom plate (705);
    support rods (720) extending from the support base (710);
    a pair of articulated pole extensions (730) pivotally attached to the support rods (720);
    powered actuators (750) connected between the support rods (720) and the articulated pole extensions (730);
    a net (740) expendably extending between the articulated pole extensions (730), wherein the net (740) is configured to seat within the clasp of the carabiner positioned on an external surface of the aircraft; and
    a motor (760) coupled to each pole extension (730) for rolling up the net on each pole extension (730).

2. The aircraft recovery apparatus of claim 1 wherein the powered actuators (750) are hydraulically or electrically or pneumatically powered.

3. The aircraft recovery apparatus of claim 1 wherein the net (740) unrolls as the articulated pole extensions (730) spread apart.

4. The aircraft recovery apparatus of claim 1 further including a winch (760) for assisting the net (740) in expanding or contracting.

* * * * *